US007083217B2

(12) United States Patent
Fukumoto et al.

(10) Patent No.: US 7,083,217 B2
(45) Date of Patent: Aug. 1, 2006

(54) OPENING AND CLOSING APPARATUS FOR A LID OF A VEHICLE

(75) Inventors: Ryoichi Fukumoto, Nagoya (JP); Masumi Nishikawa, Toyoake (JP); Mamoru Marutani, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 140 days.

(21) Appl. No.: 10/926,304

(22) Filed: Aug. 26, 2004

(65) Prior Publication Data

US 2005/0057067 A1 Mar. 17, 2005

(30) Foreign Application Priority Data

Aug. 26, 2003 (JP) ............................ 2003-301743

(51) Int. Cl.
*B62D 25/10* (2006.01)

(52) U.S. Cl. ............................ 296/76; 49/339; 49/340; 16/286

(58) Field of Classification Search .................. 296/56, 296/76, 146.4, 146.8; 49/324, 339, 340, 49/344; 16/286, 289, 306; 180/69.2, 69.21
See application file for complete search history.

(56) References Cited

U.S. PATENT DOCUMENTS 6,834,463 B1 * 12/2004 Fukumoto et al. ............ 49/341
2001/0030441 A1 * 10/2001 Wilde et al. .................. 296/76
2002/0032986 A1 * 3/2002 Yuge ........................... 49/339

(Continued)

FOREIGN PATENT DOCUMENTS

JP 2001-12146 1/2001

*Primary Examiner*—Lori L. Coletta
(74) *Attorney, Agent, or Firm*—Finnegan, Henderson, Farabow, Garrett & Dunner, LLP

(57) ABSTRACT

An opening and closing apparatus for vehicle lid includes a lower base adapted to be mounted on a body panel of the vehicle and arranged to an opening of an inner space of the vehicle, first and second hinge links rotatably connected to the lower base at each one end of the respective first and second hinge links, an upper base attached to the vehicle lid formed for closing the opening of the inner space and connected to each the other end of the respective first and second hinge links, a motor for providing a drive to the first hinge link, a drive transmitting member provided between the motor and the first hinge link for transmitting the drive from the motor to the first hinge link, a normally section torque transmitting mechanism provided between the drive transmitting member and the first hinge link for transmitting the drive to the first hinge link at a point of force reaction through the normally section torque transmitting mechanism after the drive transmitting member is rotated with a predetermined angle while the vehicle lid in a fully-opened state is under closing operation and a close-start section torque transmitting mechanism provided between the drive transmitting member and the upper base for directly pressing the upper base at a point of force reaction through the close-start section torque transmitting mechanism that a distance from a center point of the rotation of the upper base is longer than a distance of the point of force reaction through the normally section torque transmitting mechanism from the center point of the rotation of the upper base before the drive transmitting member is rotated with the predetermined angle while the vehicle lid in the fully-opened state is under closing operation.

19 Claims, 5 Drawing Sheets

U.S. PATENT DOCUMENTS

2003/0140454 A1 * 7/2003 Cheal et al. .................. 16/289
2003/0167598 A1 * 9/2003 Koestler et al. .............. 16/289
2003/0217436 A1 * 11/2003 Hashim et al. ............... 16/286
2003/0221371 A1 * 12/2003 Yokota et al. ................ 49/342
2004/0205934 A1 * 10/2004 Derbis et al. ................. 16/289

* cited by examiner

OPENING AND CLOSING APPARATUS FOR A LID OF A VEHICLE

CROSS REFERENCE TO RELATED APPLICATIONS

This application is based on and claims priority under 35 U.S.C. § 119 to Japanese Patent Application 2003-301743, filed on Aug. 26, 2003, the entire content of which is incorporated herein by reference.

FIELD OF THE INVENTION

This invention generally relates to an opening and closing apparatus for a lid of a vehicle. More particularly, the present invention pertains to a hinge mechanism for actuating a luggage door to open and close a trunk room of the vehicle by an electric motor.

BACKGROUND

A known luggage door is disclosed in Laid-open Japanese Patent No. 2001-12146. It has been preferred that the luggage door is operatable to be opened at an adequate angle without interfering a baggage loading and unloading operation. Recently, such luggage door is integrally attached to a four joint link mechanism, specifically attached to the shortest link of a double lever mechanism, so as to rotate the luggage door along with a rotation of the link. Thus, the luggage door can be operated to be opened at the adequate angle.

According to a luggage door, an opening angle thereof is determined by an angle of a link member integrally attached to the luggage door. Specifically, the opening angle of the luggage door is determined by a relative position between a first connecting pin and a second connecting pin. The first connecting pin is used for connecting a first hinge link to the link member, and the second connecting pin is used for connecting a second hinge link to the link member. Thus, the opening angle of the luggage door can be increased by positioning the second connecting pin forward of the first connecting pin.

In such configuration where the luggage door is attached to the double lever mechanism to be opened and closed, a drive for actuating the link may differs due to a relative position of each link. Specifically, the drive for actuating the link becomes large while the luggage door is closed when the first connecting pin is positioned rear of a line which is connecting the rotation shaft of the first hinge link to the second connecting pin.

Thus, when such luggage door is applied to a power luggage door actuated by a motor, the luggage door needs to equip a large drive unit (motor) which can generate a large drive for preferably operating the luggage door to be opened and closed when the luggage door in a fully-closed state is opened or when the luggage door in a fully-opened state is closed. On this account, the luggage door becomes heavy, and a large space is needed for housing the drive unit.

Thus, a need exists for a luggage door to include a hinge mechanism being operated to be opened and closed by a small drive unit.

SUMMARY OF THE INVENTION

According to an aspect of the first present invention, an opening and closing apparatus for vehicle lid comprises a lower base adapted to be mounted on a body panel of the vehicle and arranged to an opening of an inner space of the vehicle, first and second hinge links rotatably connected to the lower base at each one end of the respective first and second hinge links, an upper base attached to the vehicle lid formed for closing the opening of the inner space and connected to each the other end of the respective first and second hinge links, a motor for providing a drive to the first hinge link, a drive transmitting member provided between the motor and the first hinge link for transmitting the drive from the motor to the first hinge link, a normally section torque transmitting mechanism provided between the drive transmitting member and the first hinge link for transmitting the drive to the first hinge link at a point of force reaction through the normally section torque transmitting mechanism after the drive transmitting member is rotated with a predetermined angle while the vehicle lid in a fully-opened state is under closing operation and a close-start section torque transmitting mechanism provided between the drive transmitting member and the upper base for directly pressing the upper base at a point of force reaction through the close-start section torque transmitting mechanism that a distance from a center point of the rotation of the upper base is longer than a distance of the point of force reaction through the normally section torque transmitting mechanism from the center point of the rotation of the upper base before the drive transmitting member is rotated with the predetermined angle while the vehicle lid in the fully-opened state is under closing operation.

According to another aspect of the second present invention, an opening and closing apparatus for vehicle lid comprises a lower base adapted to be mounted on a body panel of the vehicle and arranged to an opening of an inner space of the vehicle, first and second hinge links rotatably connected to the lower base at one end of the respective first and second hinge links, an upper base attached to the vehicle lid formed for closing the opening of the inner space and connected to the other end of the respective first and second hinge links, a motor for providing a drive to the first hinge link, a drive transmitting member provided between the motor and the first hinge link for transmitting the drive from the motor to the first hinge link, a normally section torque transmitting mechanism provided between the drive transmitting member and the first hinge link for transmitting the drive to the first hinge link at a point of force reaction through the normally section torque transmitting mechanism after the drive transmitting member is rotated with a predetermined angle while the vehicle lid in a fully-closed state is under opening operation and an open-start section torque transmitting mechanism provided between the drive transmitting member and the upper base for directly pressing the upper base at a point of force reaction through the open-start section torque transmitting mechanism that a distance from a center point of the rotation of the upper base is longer than a distance of the point of force reaction through the normally section torque transmitting mechanism from the center point of the rotation of the upper base before the drive transmitting member is rotated with the predetermined angle while the vehicle lid in the fully-closed state is under opening operation.

According to further aspect of the third present invention, an opening and closing apparatus for vehicle lid comprises a lower base adapted to be mounted on a body panel of the vehicle and arranged to an opening of an inner space of the vehicle, first and second hinge links rotatably connected to the lower base at one end of the respective first and second hinge links, an upper base attached to the vehicle lid formed for closing the opening of the inner space and connected to the other end of the respective first and second hinge links, a motor for providing a drive to the first hinge link, a drive transmitting member provided between the motor and the first hinge link for transmitting the drive from the motor to the first hinge link, a first torque transmitting mechanism provided between the drive transmitting member and the first hinge link for transmitting the drive to the first hinge link at a first point of force reaction after the drive transmitting member is rotated with a predetermined angle while the vehicle lid in a fully-opened state is under closing operation or while the vehicle lid in a fully-closed state is under opening operation, a second torque transmitting mechanism provided between the drive transmitting member and the upper base for directly pressing the upper base at a second point of force reaction that a distance from a center point of the rotation of the upper base is longer than a distance of the first point of force reaction from the center point of the rotation of the upper base before the drive transmitting member is rotated with the predetermined angle while the vehicle lid in a fully-opened state is under closing operation; and a third torque transmitting mechanism provided between the drive transmitting member and the upper base for directly pressing the upper base at a third point of force reaction that a distance from the center point of the rotation of the upper base is longer than the distance of the first point of force reaction from the center point of the rotation of the upper base before the drive transmitting member is rotated with the predetermined angle while the vehicle lid in a fully-closed state is under opening operation.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is explained referring to attached drawings FIG. 1 through FIG. 6.

Figure 1:
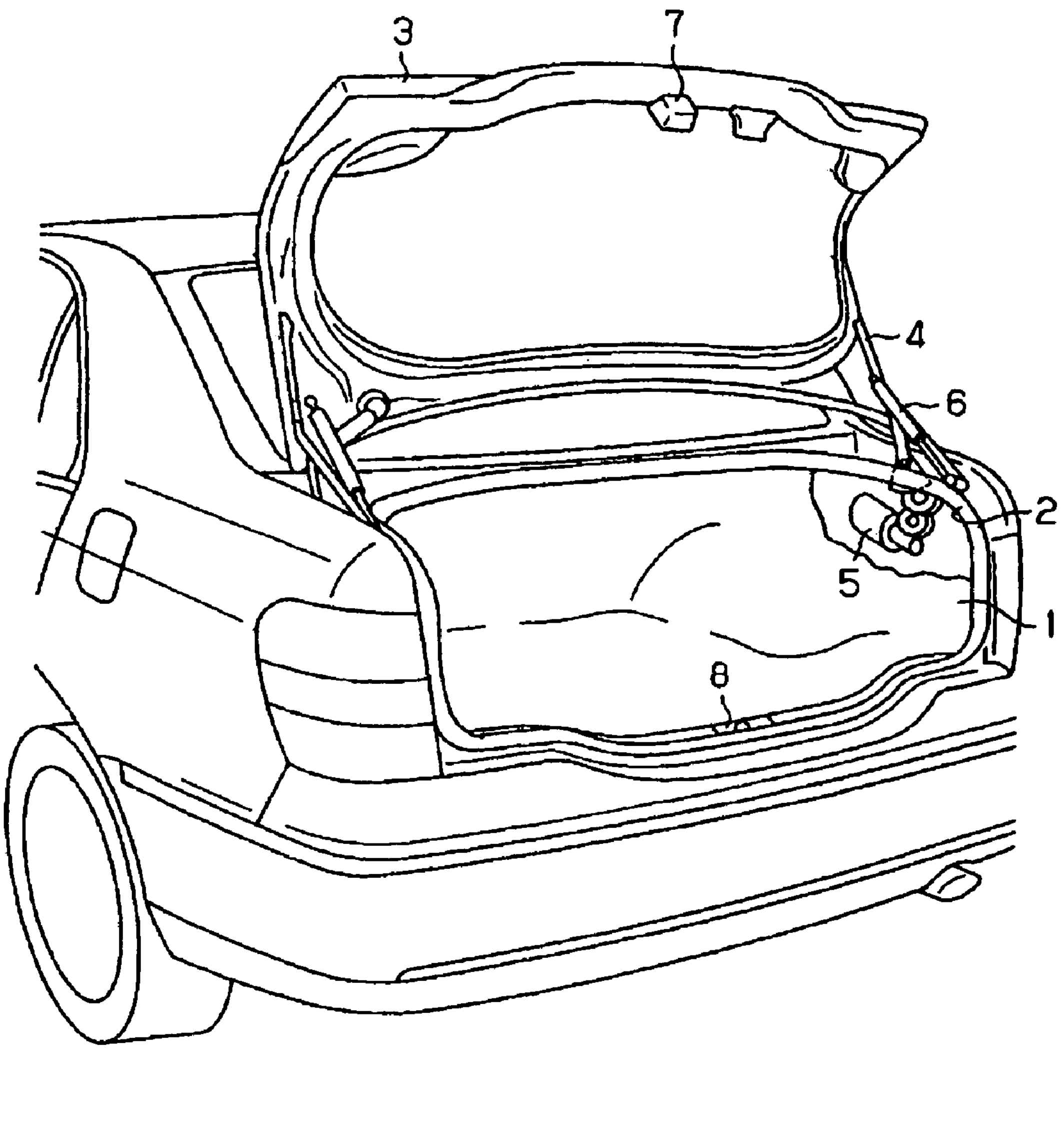
FIG. 1 illustrates a oblique perspective figure of a vehicle from the rear.

As shown in FIG. 1, a trunk room 1 is formed at the rear portion of the vehicle body. The trunk room 1 includes an opening 2 being approximately rectangular at the upper portion of the trunk room 1. A luggage door 3 serving as a lid is attached to be fit into the opening 2 of the trunk room 1 so as to open and close the opening 2. A pair of hinges 4 serving as an opening and closing apparatus, a pair of driving units 5 and a pair of damper stays 6 are provided at both ends of the opening 2 of the trunk room 1 in vehicle width direction. The luggage door 3 is supported at one side thereof by the hinges 4 to be opened and closed.

A door closer apparatus 7 is attached at the center portion of the other side of the luggage door 3. A striker 8 is provided on the vehicle body to be engaged with the door closer apparatus 7. The luggage door 3 cannot be opened and closed, which is so-called a locked state, when the door closer apparatus 7 is engaged with the striker 8.

Actuation of the door closer apparatus 7 is controlled by an electronic control unit (not shown and hereinafter refereed to as ECU). When the luggage door 3 is in a half-latch state, the door closer apparatus 7 is forced to pull the striker 8 to be fully latched so as to automatically fully close the luggage door 3. When the luggage door 3 is in a full-latch state, the door closer apparatus 7 disengages the striker 8 from the door closer apparatus 7 based on a control signal from the ECU so that the luggage door 3 is positioned at a minimum opening angle. Specifically, the luggage door 3 is positioned where the striker 8 is just disengaged from the door closer apparatus 7.

The luggage door 3 is operated to be opened and closed by the actuation of the hinge 4. Specifically, the hinge 4 is connected to the driving unit 5 which is driven based on the control signal from the ECU, so that the hinge 4 operates the luggage door 3 to be opened and closed based on a drive from the driving unit 5. In the embodiment, a pair of driving units 5 and a pair of hinges 4 are provided at both sides of the opening 2 to be symmetrical, so that configurations of the driving unit 5 and the hinge 4 provided on the right hand are referred in the following explanation.

Figure 2:
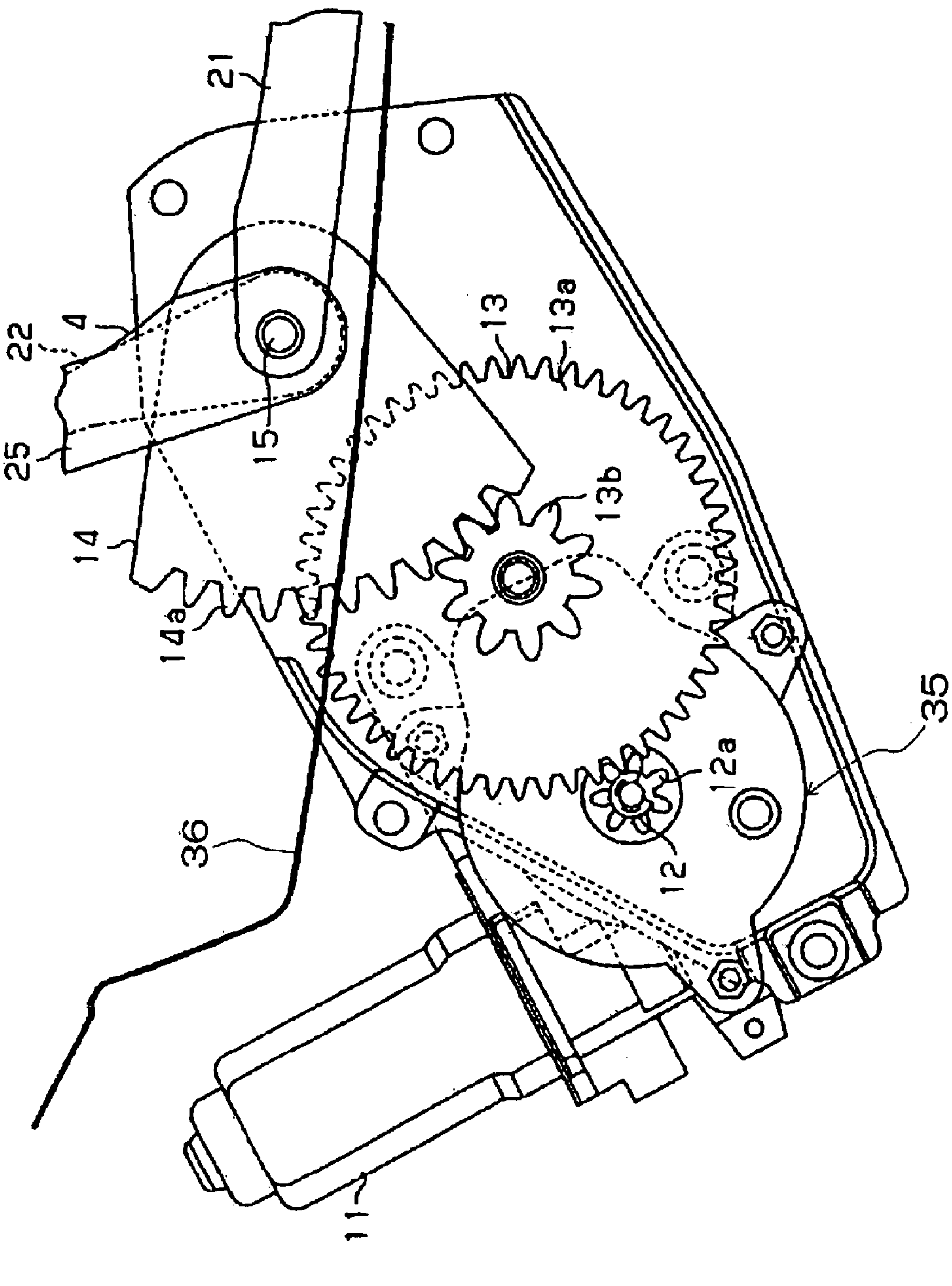
FIG. 2 illustrates an explanation diagram of a driving unit.

As shown in FIG. 2, the driving unit 5 includes a motor 11, an output shaft 12, a driving gear 13 and a driven gear 14. The motor 11 rotates in both directions based on the control signal form the ECU and provides the drive through an electromagnetic clutch 35. The motor 11 outputs a torque from the motor output shaft 12 through a reducer (not shown) including a worm and worm wheel.

The motor output shaft 12 includes a gear **12*a* meshing with a first gear portion 13*a* of the driving gear 13. The driving gear 13 includes a second gear portion 13*b* being integrally rotatable with the first gear portion 13*a* on a same axis. The second gear portion 13*b* is meshed with a gear portion 14*a* formed on the driven gear 14 being approximately a sector form. The driven gear 14 is rotatable in both directions relative to a drive shaft 15 which is provided at the center of the driven gear 14**.

A shaft line of the cylindrical drive shaft 15 of the driven gear 14 extends in the shaft direction. When the motor 11 is actuated, the driving unit 5 having such configuration provides a rotation from the motor output shaft 12 to the drive shaft 15 through the driving gear 13 and the driven gear 14. The drive shaft 15 is connected to the hinge 4 so as to operate the hinge 4 and the luggage door 3.

Figure 3:
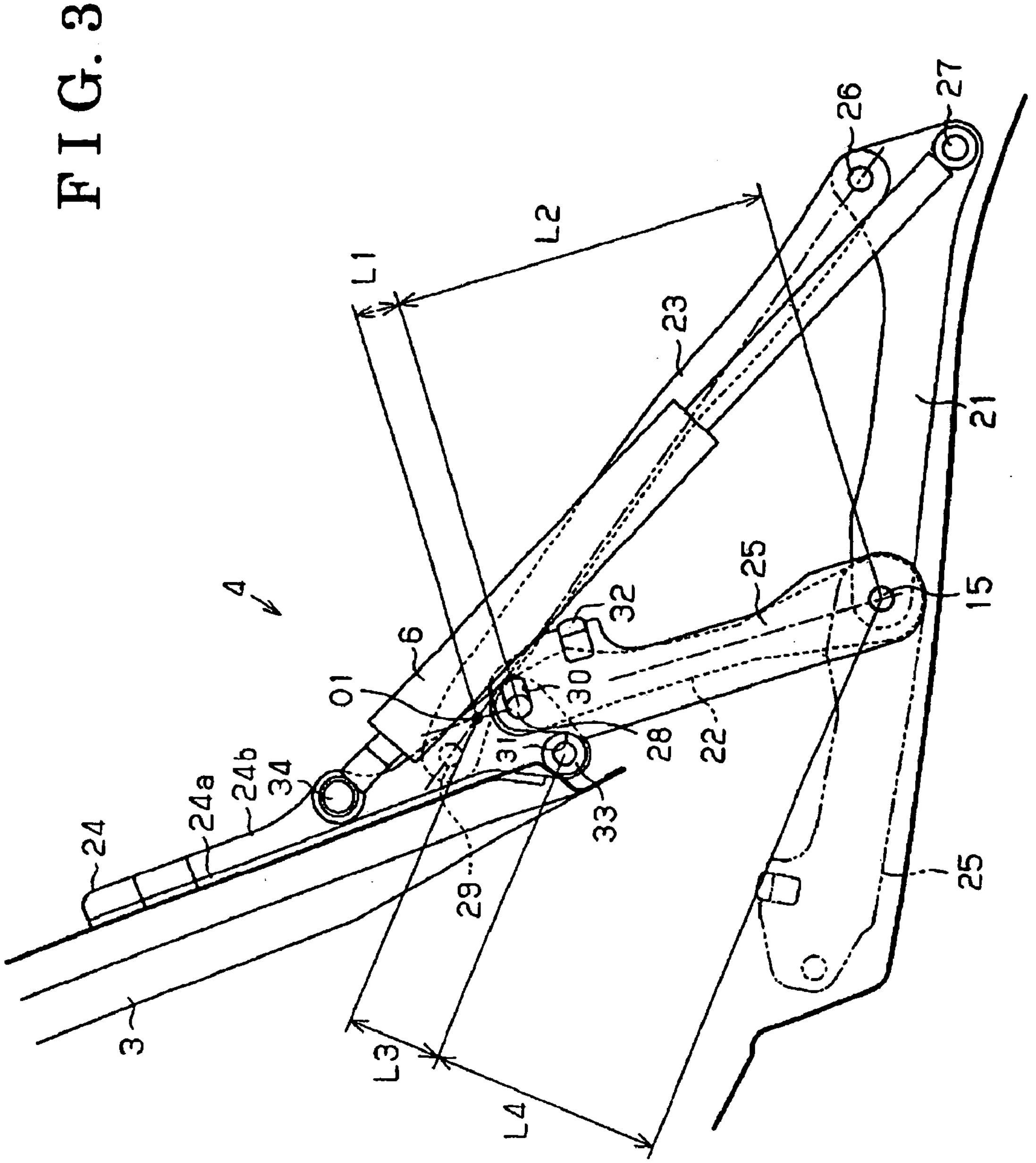
FIG. 3 illustrates an explanation diagram of a luggage door in a fully-opened state.

The configuration of the hinge 4 will be explained in detail as follows. As shown in FIG. 3, the hinge 4 includes a lower base 21, a first hinge link 22, a second hinge link 23, an upper base 24 and a drive link 25 serving as a drive transmitting member to form a four joint link mechanism, specifically, a double lever mechanism. The double lever mechanism includes a link provided at an opposite side of the shortest link thereof and fixed to be immobilized. In the embodiment, the upper base 24 integrally fixed to the luggage door 3 is set to be the shortest link, and the lower base 21 positioned at the opposite side of the upper base 24 is integrally attached to a body panel 36 of the vehicle body.

The lower base 21, the first hinge link 22, the second hinge link 23 and the drive link 25 are long-board shape. The upper base 24 being a long-board shape is bended to be approximately L-shaped. The upper base 24 includes a fixing portion **24*a* integrally attached to the luggage door 3 and a connecting portion 24*b* being extending from the fixing portion 24*a*** in vertical direction.

The lower base 21 includes a shaft hole at the front end thereof and two shaft holes at the rear end thereof. The drive shaft 15 is penetrated through the front shaft hole of the lower base 21 to be rotatable relative to the lower base 21. Thus, the rotation of the drive shaft 15 is not transmitted to the lower base 21. A first connecting pin 26 is penetrated through the upper-rear hole in FIG. 3 relatively rotatably connecting the second hinge link 23 to the lower base 21. A second connecting pin 27 is penetrated through the lower-rear hole in FIG. 3 for relatively rotatably connecting the damper stays 6 to the lower base 21.

The length of the first hinge link 22 in longitudinal direction thereof is approximately the same as the length of the lower base 21 in longitudinal direction thereof. The first hinge link 22 includes two holes at both ends thereof. The drive shaft 15 is penetrated to be rotatably relative to the first hinge link 22 through one lower hole of the first hinge link 22 in FIG. 3 when the luggage door 3 is in a fully-opened state. Thus, the rotation of the rotation shaft 15 is not transmitted to the first hinge link 22. A third connecting pin 28 is penetrated through the other hole of the first hinge link 22 provided upward in FIG. 3. where the luggage door 3 is in the fully-opened state, and the first hinge link 22 is connected to the upper base 24 by the third connecting pin 28.

The length of the second hinge link 23 in longitudinal direction thereof is longer than the length of the lower base 21 and the first hinge link 22 in longitudinal direction thereof. The second hinge link 23 includes two holes at both ends thereof. The first connecting pin 26 is penetrated through the lower hole of the second hinge link 23 in FIG. 3 where the luggage door 3 is in the fully-opened state. A fourth connecting pin 29 is penetrated through the upper hole of the second hinge link 23 in FIG. 3 where the luggage door 3 is in the fully-opened state. Thus, the second hinge link 23 is relatively rotatably connected to the upper base 24 by the fourth connecting pin 29.

The length of the drive link 25 in longitudinal direction thereof is approximately the same as the length of the first hinge link 22 in longitudinal direction thereof. The driving link 25 includes a shaft hole at one end thereof and a elongated hole 30 at the other end thereof. The elongated hole 30 is being an elliptical shape and extending in circumferential direction relative to the shaft hole. A distance between the shaft hole and the elongated hole 30 is approximately the same as the distance between the two holes of the first hinge link 22. The drive shaft 15 is penetrated through the shaft hole of the drive link 25 rotatably together therewith so that the drive link 25 rotates relative to the shaft hole thereof together with the rotation of the drive shaft 15.

The third connecting pin 28 is penetrated through the elongated hole 30 of the drive link 25. The third connecting pin 28 is formed to be slidable along the inner surface of the elongated hole 30, so that the drive link 25 are rotatable relative to the first hinge link 22 about the drive shaft 15 with the length of the elongated hole 30 in longitudinal direction thereof.

The drive link 25 includes a cam surface 31 being gently curved an outer edge of one side of the drive link 25 in width direction thereof near the one end of the elongated hole 30. A pressing portion 32 is integrally attached to the drive link 25 at the other side in width direction thereof outwardly projecting in width direction thereof. The cam surface 31 is adapted to press a roller 33 when the luggage door 3 is in the fully-opened state or an approximately fully-opened state as shown in FIG. 3. The pressing portion 32 is projecting with a predetermined value so as to engage with the upper base 24. An illustration of the damper stays 6 is abbreviated from FIG. 4 in order to avoid that the diagram becomes more complicated.

The upper base 24 includes three shaft holes at the connecting portion **24*b* thereof, and respective third connecting pin 28, fourth connecting pin 29 and fifth connecting pin 34 are penetrated through respective three shaft holes. The length between the hole through which the third connecting pin 28 is penetrated and the hole through which the fourth connecting pin 29 is penetrated is shorter than each length of the lower base 21, the first hinge link 22 and the second hinge link 23 in longitudinal direction thereof, so that the link formed on the upper base 24** is set to be shortest link of the four joint link mechanism.

Figure 4:
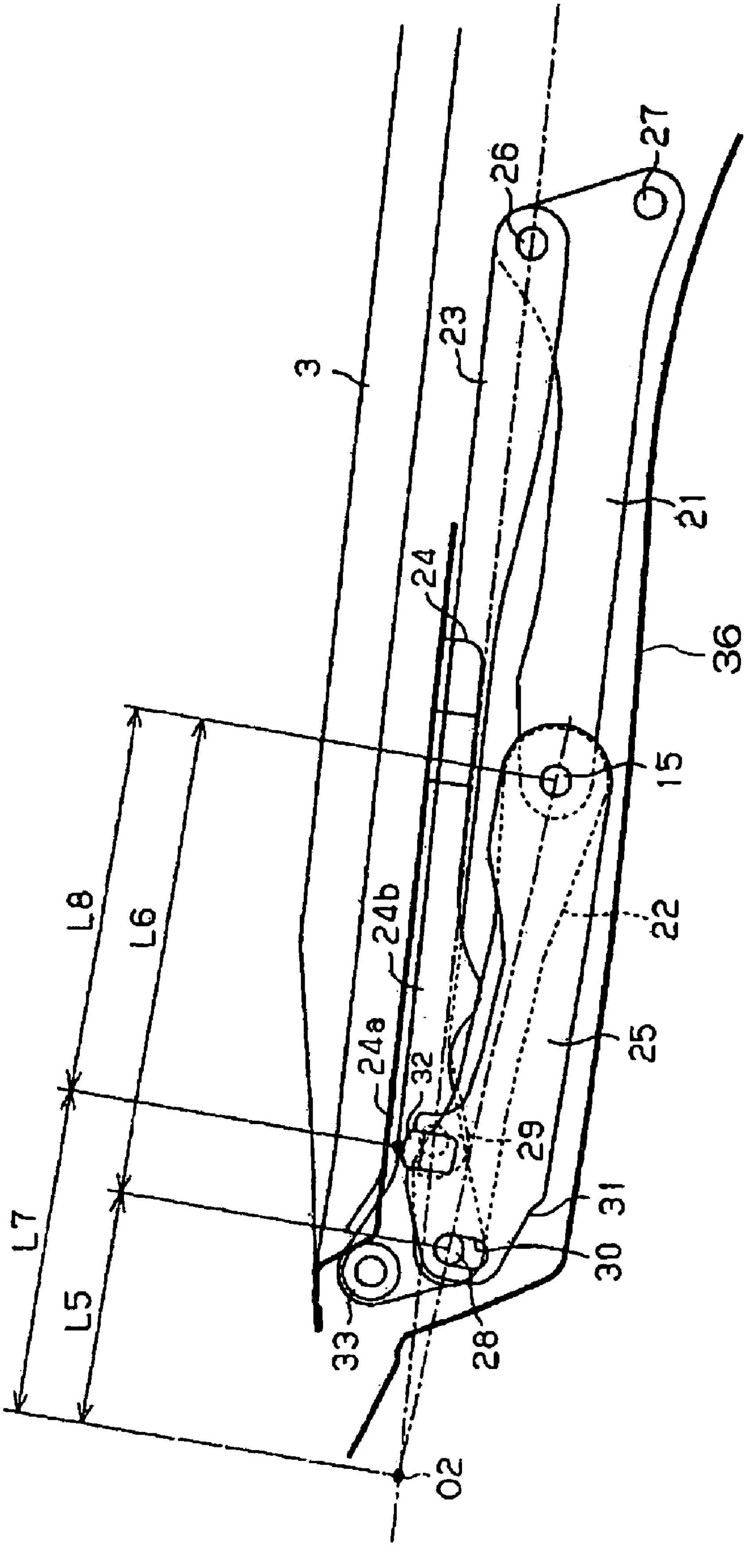
FIG. 4 illustrates an explanation diagram of a luggage door in a fully-closed state.

The position and an angle of the upper base 24 are determined by the relative positions between the third connecting pin 28 and the fourth connecting pin 29. The luggage door 3 attached to the upper base 24 is operated to be opened and closed by changing the relative position and the angle of the upper base 24. Specifically, the opening and closing angle of the luggage door 3 is changed approximately along the line connecting the third connecting pin 28 and the fourth connecting pin 29, and the luggage door 3 is positioned at front of the vehicle (left upper in FIG. 3) when the fourth connecting pin 29 is positioned at front (left upper in FIG. 3) relative to the third connecting pin 28. Further, as shown in FIG. 4, the luggage door is positioned at rear of the vehicle (right in FIG. 4) when the fourth connecting pin 29 is positioned at rear (right in FIG. 4) relative to the third connecting pin 28.

The roller 33 is supported at the connecting portion **24*b* of the upper base 24. A diameter of the roller 33 is set to be that the outer peripheral surface thereof constantly pushes the cam surface 31 of the drive link 25**.

The upper base 24 is relatively rotatably connected to the damper stay 6 by the fifth connecting pin 34 which is penetrating through the shaft hole formed at the connecting portion **24*b* of the upper base 24**.

A configuration of the damper stay 6 relatively rotatably connected to both lower base 21 and the upper base 24 will be explained below. The damper stay 6 includes a gas piston mechanism into which high pressured gas is injected. The damper stay 6 is connected to the lower base 21 with the second connecting pin 27 at one end of the damper stay 6. The damper stay 6 is further connected to the upper base 24 with the fifth connecting pin 34 at the other end of the damper stay 6. The damper stay 6 is provided for preventing a rapid door opening and closing operation and supporting the door opening closing operation in response to the position of the luggage door 3.

The hinge 4 having such configuration is actuated by the rotation of the drive link 25 which is rotated by the driving unit 5 in clockwise direction or the anticlockwise direction, so that the upper base 24 and the luggage door 3 is rotated based on the actuation of the hinge 4. The center point of the rotation (instantaneous center) of the upper base 24 and the luggage door 3 is changed as needed corresponding to the positions of the first hinge link 22 and the second hinge link 23. As such center point is changed, a fulcrum and a point of force reaction are changed so that the drive required for actuating the upper base 24 and the luggage door 3 are also changed. The center point of the rotation of the upper base 24 and the luggage door 3 (shown as O1 in FIG. 3 and O2 in FIG. 4) is represented by an intersection point of a line which is connecting the drive shaft 15 and the third connecting pin 28 and a line which is connecting the first connecting pin 26 and the fourth connecting pin 29.

The closing process of the luggage door 3 will be explained as follows. As shown in FIG. 3, the third connecting pin 28 is engaged with the left end of the elongated hole 30, and the cam surface 31 of the drive link 25 is engaged with the roller 33 when the luggage door 3 is in the fully-opened state. As the luggage door 3 being in such fully-opened state is operated to be closed, the drive shaft 15 and the drive link 25 integrally attached to the drive shaft 15 are rotated in anticlockwise direction by the ECU through the driving unit 5.

When the drive link 25 is rotated in anticlockwise direction, the roller 33 is pressed in left direction by the cam surface 31 formed at the left end of the drive link 25 so as to be engaged therewith.

At this point, the third connecting pin 28 is engaged with the left end of the elongated hole 30 formed at the one end of the drive link 25 in circumferential direction thereof relative to the drive shaft 15, so that the drive link 25 is rotated in anticlockwise direction with a predetermined angle without the pressure applied to the third connecting pin 28 until the third connecting pin 28 is engaged with the right end of the elongated hole 30.

As the roller 33 is pressed in left direction, the upper base 24 and the luggage door 3 is rotated relative to the instantaneous center O1. Specifically, the upper base 24 and the luggage door 3 are rotated in clockwise direction relative to the instantaneous center O1.

Thus, the upper base 24 and the luggage door 3 are rotated in clockwise direction relative to the instantaneous center O1 due to the pressure applied by the cam surface 31 before the first hinge link 22 is rotated, and that the barycenter of the luggage door 3 is approached to the approximately upper of the instantaneous center O1, as a result, a torque forced in the fully-opened direction can be minimized due to the luggage door's own weight.

As the drive link 25 is rotated in anticlockwise direction relative to the drive shaft 15, the upper base 24 and the luggage door 3 is rotated with a predetermined angle in clockwise direction, as a result, the third connecting pin 28 is engaged with the right end of the elongated hole 30.

Once the third connecting pin 28 is engaged with the right end of the elongated hole 30, a rotation force applied to the drive link 25 in anticlockwise direction is transmitted to the third connecting pin 28 through the right end of the elongated hole 30, which is used for rotating the first hinge link 22 relative to the drive shaft 15. In this way, the first hinge link 22 is rotated in anticlockwise direction; as a result, the luggage door 3 becomes in the fully-closed state as illustrated in a chain double-dashed line of FIG. 3.

A torque of the drive shaft 15 required for rotating the luggage door 3 from being in the fully-opened state to the fully-closed state will be explained as follows. Such torque of the drive shaft 15 required for rotating the luggage door 3 and the upper base 24 varies based on a relative positions among the drive shaft 15 (point of force application), the instantaneous center O1 (fulcrum) and the pressing point at which the pressure is applied to the upper base 24 (point of force reaction).

Specifically, the torque of the drive shaft 15 required for rotating the upper base 24 and the luggage door 3 without the drive link 25 at a predetermined torque T is obtained by the following formula, and the pressing point (first point of force reaction) at which the upper base 24 is pressed corresponds to the position of the third connecting pin 28.

$$Ta=L2/L1\times T$$

On the other hand, when the drive link 25 is used, the pressing point (second point of force reaction when the luggage door 3 is under closing operation) at which the upper base 24 is pressed corresponds to a point at which the cam surface 31 is engaged with the roller 33, the torque of the drive shaft 15 required for rotating the upper base 24 and the luggage door 3 at a predetermined torque T is obtained by the following formula.

$$Tb=L4/L3\times T$$

It is clear from FIG. 3 that L3 is larger than L1, and L4 is smaller than L3, so that a torque Tb required for rotating the upper base 24 and the drive link 25 at the predetermined torque T with the drive link 25 is smaller than a torque Ta required for rotating the upper base 24 and the drive link 25 at the predetermined torque T without the drive link 25.

Figure 5:
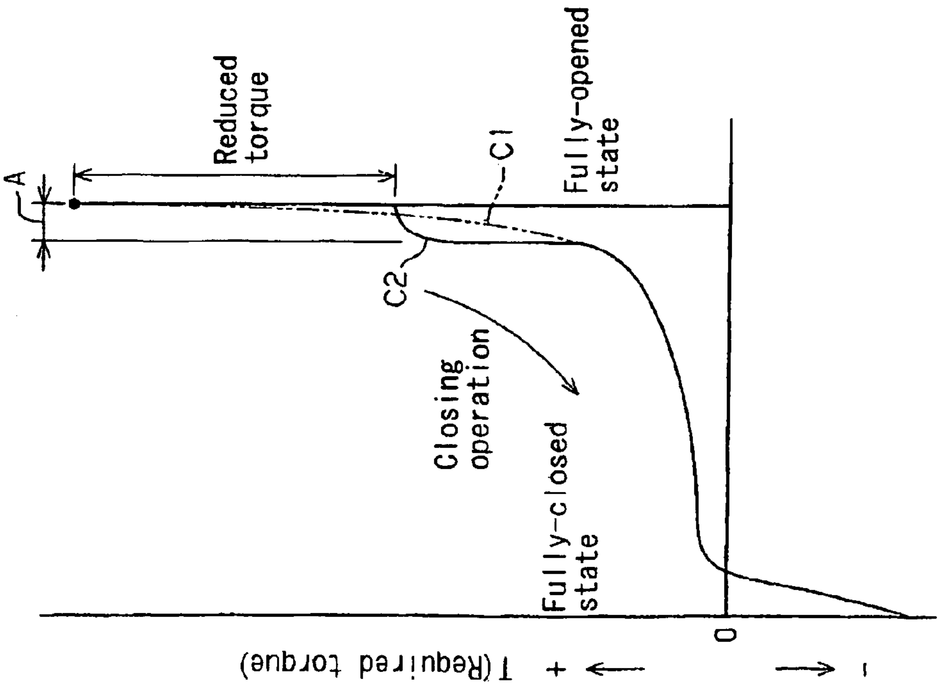
FIG. 5 illustrates an explanation diagram of a required torque when the luggage door is operated to be closed.

FIG. 5 illustrates a characteristic drawing indicating a variation of the torque required for closing the luggage door 3. A vertical axis indicates the amount of the torque, and a horizontal axis indicates the opening and closing state of the luggage door 3.

A curve line C1 indicates the torque Ta required for closing the luggage door 3 when the drive link 25 is not used, and a curve line C2 indicates the torque Tb required for closing the luggage door 3 when the drive link 25 is used. A distance (A) shown in FIG. 5 indicates a period during which the cam surface 31 engages with the roller 33 when the luggage door 3 being in the fully-opened state or the approximately fully-opened state is operated to be closed in the manner described above. Thus, the torque which is required at a starting point when the luggage door 3 being in the fully-opened state is operated to be closed can be reduced using the drive link 25.

Next, the opening process of the luggage door 3 will be explained as follows. As shown in FIG. 4, the third connecting pin 28 is engaged with the elongated hole at the upper end thereof in FIG. 4, and an upper surface of the pressing portion 32 is engaged with the upper base 24 when the luggage door 3 is in the fully-closed state. As the luggage door 3 being in such fully-closed state is operated to be opened, the drive shaft 15 and the drive link 25 integrally attached to the drive shaft 15 are rotated in clockwise direction by the ECU through the driving unit 5.

As the drive link 25 is rotated in clockwise direction, a pressure is applied to the upper base 24 by the pressing portion 32 attached to the upper end of the drive link 25 and engaged with the upper base 24 being pressed upwardly.

As the upper base 24 is pressed upwardly, the upper base 24 and the luggage door 3 are rotated relative to the instantaneous center O2. Specifically, the upper base 24 and the luggage door 3 are rotated in anticlockwise direction relative to the instantaneous center O2 in FIG. 4.

At this point, the third connecting pin 28 is engaged with the upper end of the elongated hole 30 formed at one end of the drive link 25 in circumferential direction relative to the drive shaft 15, so that the drive link 25 is rotated in clockwise direction without applying the force to the third connecting pin 28 until the lower end of the elongated hole 30 in FIG. 4 is engaged with the third connecting pin 28.

The drive link 25 is rotated in clockwise direction relative to the drive shaft 15, and the upper base 24 and the luggage door 3 is rotated with a predetermined angle in anticlockwise direction due to the force applied to the upper base 24 by the pressing portion 32 of the drive link 25, as a result, the third connecting pin 28 is engaged with the lower end of the elongated hole 30.

Once the third connecting pin 28 is engaged with the lower end of the elongated hole 30, the force for rotating the drive link 25 in clockwise direction is transmitted from the lower end of the elongated hole 30 to the third connecting pin 28, then such transmitted force transmitted to the third connecting pin 28 is used for rotating the first hinge link 22 relative to the drive shaft 15 in clockwise direction until the luggage door 3 becomes in the fully-opened state as shown in FIG. 3.

A torque of the drive shaft 15 for rotating the luggage door 3 from being in the fully-closed state to the fully-opened state will be explained hereinbelow. Such torque of the drive shaft 15 required for rotating the luggage door 3 and the upper base 24 varies based on a relative positions among the drive shaft 15 (point of force application), the instantaneous center O2 (fulcrum) and the pressing point at which the pressure is applied to the upper base 24 (point of force reaction).

Specifically, the torque of the drive shaft 15 required for rotating the upper base 24 and the luggage door 3 without the drive link 25 at the predetermined torque T is obtained by the following formula, and the pressing point (first point of force reaction) at which the upper base 24 is pressed corresponds to the position of the third connecting pin 28.

$$Tc=L6/L5\times T$$

On the other hand, when the pressing portion 32 of the drive link 25 is used, the pressing point (third point of force reaction) at which the upper base 24 is pressed corresponds to a point at which the pressing point 32 is engaged with the upper base 24, and the torque of the drive shaft 15 required for rotating the upper base 24 and the luggage door 3 at a predetermined torque T is obtained by the following formula.

$$Td=L8/L7\times T$$

It is clear from FIG. 4 that L7 is larger than L5, and L8 is smaller than L6, so that a torque Td required for rotating the upper base 24 and the drive link 25 at the predetermined torque T when the drive link 25 is used is smaller than a torque Tc required for rotating the upper base 24 and the drive link 25 at the predetermined torque T when the drive link 25 is not used.

Figure 6:
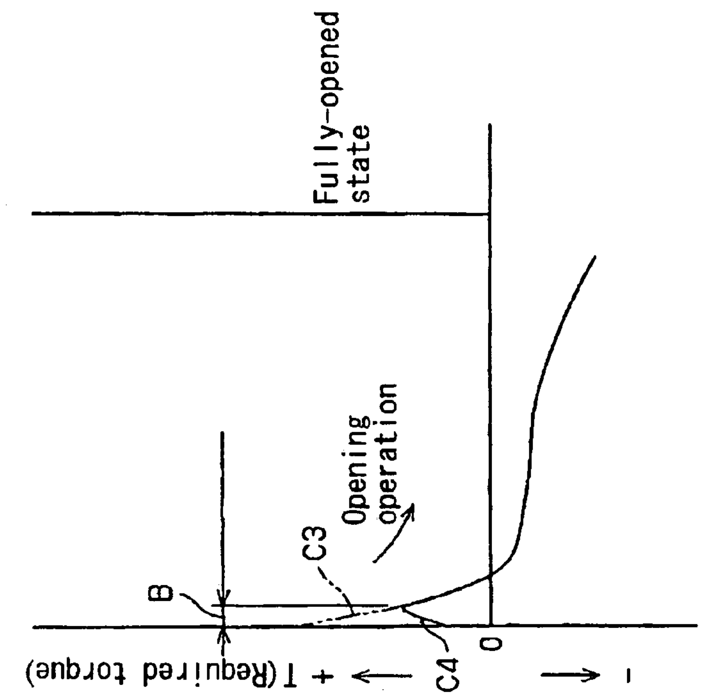
FIG. 6 illustrates an explanation diagram of a required torque when the luggage door is operated to be opened.

FIG. 6 illustrates a characteristic drawing indicating a variation of the torque required for closing the luggage door 3. A vertical axis indicates the amount of the torque, and a horizontal axis indicates the opening and closing state of the luggage door 3.

A curve line C3 indicates the torque Tc required for opening the luggage door 3 when the drive link 25 is not used, and a curve line C4 indicates the torque Td required for opening the luggage door 3 when the drive link 25 is used. A distance (B) shown in FIG. 6 indicates a period during which the pressing portion 32 engages with the upper base 24 when the luggage door 3 being in the fully-closed state or an approximately fully-closed state is operated to be opened in the manner described above. Thus, the torque which is required at a starting point when the luggage door 3 being in the fully-closed state is operated to be opened can be reduced using the drive link 25.

According to an aspect of the embodiment of the current invention, the upper base 24 and the luggage door 3 is rotated by the cam surface 31 relative to the instantaneous center O1 in clockwise direction before the first hinge link 22 starts to be rotated when the luggage door 3 being in the fully-opened state is operated to be closed. Thus, a torque which is used to rotate the luggage door 3 in the fully-opened state can be reduced due to the luggage door's own weight. Thus, the upper base 24 and the luggage door 3 can be actuated with the small torque, as a result, the motor mounted on the vehicle can be downsized.

According to another aspect of the embodiment of the present invention, when the hinge 4 includes the drive link 25, the distance between the instantaneous center O1 and the point where the force is applied for closing the luggage door 3 is longer than the distance between the instantaneous center O1 and the third connecting pin 28 which serves as a pressed point when the drive link 25 is not used, so that the maximum value of the torque required for closing the luggage door 3 can be reduced, further, the motor mounted on the vehicle can be downsized.

According to further aspect of the current invention, when the hinge 4 includes the drive link 25, the distance between the instantaneous center O2 and the point where the force is applied for opening the luggage door 3 is longer than the distance between the instantaneous center O2 and the third connecting pin 28 which serves as a pressed point when the drive link 25 is not used, so that the maximum value of the torque required for operating the luggage door 3 to be opened can be reduced, further, the motor mounted on the vehicle can be downsized.

According to still further aspect of the current invention, the motor 11 can transmits the drive through the electromagnetic clutch 35 so as to actuate the link mechanism independent from the motor by releasing the connection between the motor and the link mechanism. Thus, the luggage door is manually opened and closed without the force generated by the motor.

In the embodiment, when the luggage door 3 is in the fully-opened state, the roller 33 of the upper base 24 is pressed by the cam surface 31 of the drive link 25 so as to close the luggage door 3, however, the upper base 24 may be engaged with the drive link 25 in another way.

In addition, when the luggage door 3 is in the fully-opened state, the roller 33 is pressed by the cam surface 31 so as to close the upper base 24 and the luggage door 3, however, an alternative device may be used if such device includes a means for pressing the upper base 24 at a position where a distance between the means and the instantaneous center O1 when the luggage door 3 is in the fully-opened state is longer than a distance between the instantaneous center O1 and the third connecting pin 28.

Further, when the luggage door 3 is in the fully-closed state, the upper base 24 is pressed by the pressing portion 32 so as to operate the upper base 24 and the luggage door 3 to be opened, however an alternative device may be used if such device includes a means for pressing the upper base 24 at a position where a distance between the means and the instantaneous center O2 when the luggage door 3 is in the fully-closed state is longer than a distance between the instantaneous center O2 and the third connecting pin 28.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An opening and closing apparatus for vehicle lid comprising:

- a lower base adapted to be mounted on a body panel of the vehicle and arranged to an opening of an inner space of the vehicle;
- first and second hinge links rotatably connected to the lower base at each one end of the respective first and second hinge links;
- an upper base attached to the vehicle lid formed for closing the opening of the inner space and connected to each the other end of the respective first and second hinge links;
- a motor for providing a drive to the first hinge link;
- a drive transmitting member provided between the motor and the first hinge link for transmitting the drive from the motor to the first hinge link;
- a normally section torque transmitting mechanism provided between the drive transmitting member and the first hinge link for transmitting the drive to the first hinge link at a point of force reaction through the normally section torque transmitting mechanism after the drive transmitting member is rotated with a predetermined angle while the vehicle lid in a fully-opened state is under closing operation, and
- a close-start section torque transmitting mechanism provided between the drive transmitting member and the upper base for directly pressing the upper base at a point of force reaction through the close-start section torque transmitting mechanism that a distance from a center point of the rotation of the upper base is longer than a distance of the point of force reaction through the normally section torque transmitting mechanism from the center point of the rotation of the upper base before the drive transmitting member is rotated with the predetermined angle while the vehicle lid in the fully-opened state is under closing operation.

2. The opening and closing apparatus according to claim 1 further comprising:

- a drive shaft rotatably supported to the lower base and coupled to the motor, the drive transmitting member is attached to the drive shaft rotatably together with the drive shaft, and the first hinge link is rotatably supported on the drive shaft.

3. The opening and closing apparatus according to claim 2, wherein the normally section torque transmitting mechanism includes an elongated hole formed at the drive transmitting member in circumferential direction relative to the drive shaft and a pin formed at the first hinge link to be fit into the elongated hole and being engagable therewith.

4. The opening and closing apparatus according to claim 3, wherein the first hinge link is rotatably connected to the upper base by the pin.

5. The opening and closing apparatus according to claim 1, wherein the close-start section torque transmitting mechanism includes a cam surface at the drive transmitting member for pressing the upper base.

6. The opening and closing apparatus according to claim 1 further includes a clutch for disconnecting the connection between the motor and the drive transmitting member.

7. An opening and closing apparatus for vehicle lid comprising:

- a lower base adapted to be mounted on a body panel of the vehicle and arranged to an opening of an inner space of the vehicle;
- first and second hinge links rotatably connected to the lower base at one end of the respective first and second hinge links;
- an upper base attached to the vehicle lid formed for closing the opening of the inner space and connected to the other end of the respective first and second hinge links;
- a motor for providing a drive to the first hinge link;
- a drive transmitting member provided between the motor and the first hinge link for transmitting the drive from the motor to the first hinge link;
- a normally section torque transmitting mechanism provided between the drive transmitting member and the first hinge link for transmitting the drive to the first hinge link at a point of force reaction through the normally section torque transmitting mechanism after the drive transmitting member is rotated with a predetermined angle while the vehicle lid in a fully-closed state is under opening operation; and
- an open-start section torque transmitting mechanism provided between the drive transmitting member and the upper base for directly pressing the upper base at a point of force reaction through the open-start section torque transmitting mechanism that a distance from a center point of the rotation of the upper base is longer than a distance of the point of force reaction through the normally section torque transmitting mechanism from the center point of the rotation of the upper base before the drive transmitting member is rotated with the predetermined angle while the vehicle lid in the fully-closed state is under opening operation.

8. The opening and closing apparatus according to claim 7 further comprising:

- a drive shaft rotatably supported to the lower base and coupled to the motor, the drive transmitting member is attached to the drive shaft rotatably together with the drive shaft, and the first hinge link is rotatably supported on the drive shaft.

9. The opening and closing apparatus according to claim 8, wherein the normally section torque transmitting mechanism further includes an elongated hole formed at the drive transmitting member in circumferential direction relative to the drive shaft and a pin formed at the first hinge link to be fit into the elongated hole and being engagable therewith.

10. The opening and closing apparatus according to claim 9, wherein the first hinge link is rotatably connected to the upper base by the pin.

11. The opening and closing apparatus according to claim 7, wherein the open-start section torque transmitting mechanism includes a pressing portion at the drive transmitting member to be engaged with the upper base.

12. The opening and closing apparatus according to claim 7 further includes a clutch for disconnecting the connection between the motor and the drive transmitting member.

13. An opening and closing apparatus for vehicle lid comprising:

- a lower base adapted to be mounted on a body panel of the vehicle and arranged to an opening of an inner space of the vehicle;
- first and second hinge links rotatably connected to the lower base at one end of the respective first and second hinge links;

an upper base attached to the vehicle lid formed for closing the opening of the inner space and connected to the other end of the respective first and second hinge links;

a motor for providing a drive to the first hinge link;

a drive transmitting member provided between the motor and the first hinge link for transmitting the drive from the motor to the first hinge link;

a first torque transmitting mechanism provided between the drive transmitting member and the first hinge link for transmitting the drive to the first hinge link at a first point of force reaction after the drive transmitting member is rotated with a predetermined angle while the vehicle lid in a fully-opened state is under closing operation or while the vehicle lid in a fully-closed state is under opening operation;

a second torque transmitting mechanism provided between the drive transmitting member and the upper base for directly pressing the upper base at a second point of force reaction that a distance from a center point of the rotation of the upper base is longer than a distance of the first point of force reaction from the center point of the rotation of the upper base before the drive transmitting member is rotated with the predetermined angle while the vehicle lid in a fully-opened state is under closing operation; and a third torque transmitting mechanism provided between the drive transmitting member and the upper base for directly pressing the upper base at a third point of force reaction that a distance from the center point of the rotation of the upper base is longer than the distance of the first point of force reaction from the center point of the rotation of the upper base before the drive transmitting member is rotated with the predetermined angle while the vehicle lid in a fully-closed state is under opening operation.

14. The opening and closing apparatus according to claim 13 further comprising:

a drive shaft rotatably supported to the lower base and coupled to the motor, the drive transmitting member is attached to the drive shaft rotatably together with the drive shaft, and the first hinge link is rotatably supported on the drive shaft.

15. The opening and closing apparatus according to claim 14, wherein the first torque transmitting mechanism includes an elongated hole formed at the drive transmitting member in circumferential direction relative to the drive shaft and a pin formed at the first hinge link to be fit into the elongated hole and being engagable therewith.

16. The opening and closing apparatus according to claim 15, wherein the first hinge link is relatively rotatably connected to the upper base by the pin.

17. The opening and closing apparatus according to claim 13, wherein the second torque transmitting mechanism includes a cam surface at the drive transmitting member for pressing the upper base.

18. The opening and closing apparatus according to claim 13, wherein the third torque transmitting mechanism includes a pressing portion at the drive transmitting member to be engaged with the upper base.

19. The opening and closing apparatus according to claim 13 further includes a clutch for disconnecting the connection between the motor and the drive transmitting member.

* * * * *